United States Patent

[11] 3,583,247

| [72] | Inventor | Herman L. Paul jr.<br>450 Westover Road, Stamford, Conn. 06902 |
|---|---|---|
| [21] | Appl. No. | 784,735 |
| [22] | Filed | Dec. 18, 1968 |
| [45] | Patented | June 8, 1971 |

[54] POWER ACTUATOR FOR ROTARY VALVES
4 Claims, 6 Drawing Figs.

[52] U.S. Cl. ......................................... 74/89
[51] Int. Cl. ...................................... F16h 27/02
[50] Field of Search............................. 74/89; 92/138; 251/58; 74/48, 49

[56] References Cited
UNITED STATES PATENTS

| 852,351 | 4/1907 | Seyler, Jr. .................... | 92/138 |
| 2,678,029 | 5/1954 | Sprague et al. ................ | 92/138 |
| 3,246,581 | 4/1966 | Carr ............................. | 92/138 |
| 3,398,762 | 8/1968 | Fredd ........................... | 251/58 |
| 1,474,769 | 11/1923 | Dunning ....................... | 92/138 |
| 347,644 | 8/1886 | Salmon......................... | 74/49 |
| 3,067,728 | 12/1962 | Bordini......................... | 74/49 |
| 3,195,420 | 7/1965 | Johannsen..................... | 74/49 |

*Primary Examiner*—Fred C. Mattern, Jr.
*Assistant Examiner*—Wesley S. Ratliff, Jr.
*Attorney*—F. J. Pisarra

ABSTRACT: This invention is directed to a power actuator for rotary valves and includes a body block having an internal reciprocatory piston, a valve stem coupling rotatably mounted in the body block at a right angle to the axis of the piston and rotor and pin devices interconnecting the piston and valve stem coupling for rotating same as the piston is moved.

INVENTOR
HERMAN L. PAUL, JR.
BY F. J. Pisarra
ATTORNEY

INVENTOR
HERMAN L. PAUL, JR.

POWER ACTUATOR FOR ROTARY VALVES

RELATED APPLICATION

Copending application by the same inventor Ser. No. 588,509, filed Oct. 21, 1966, now U.S. Pat. No. 3,417,628, for "Motion Converting Mechanism" discloses and claims the type of mechanism per se that is employed in this invention to convert reciprocal motion to rotary motion.

THE INVENTION

This invention relates generally to new and useful improvements in mechanisms for converting rectilinear motion to rotary motion and particularly seeks to provide a novel power actuator for remotely located rotary valves.

It is of course well known to employ many types of valves in industrial and maritime operations, such as ball, plug or butterfly valves, that require only a quarter turn from fully open to fully closed positions. However, in the past most ship or shore piping systems have permitted such valves to be installed at locations that were readily accessible and the valves could be operated either manually or by power actuators that were not under any space limitations insofar as size was concerned.

More recently, however, there has been a marked trend to remote control of such piping systems, whether or not computerized, and advanced design technology has enabled the piping systems to become progressively more compact. This frequently requires that valves and other controllable components be installed in normally inaccessible locations in limited spaces so that compact power actuators are required, as in the latest designs for land and naval nuclear power plants and in sea water control valves in naval and other types of seagoing vessels. Furthermore, it is now essential to have compact power actuators for the rotary sea water valves for deep submergence vessels in order to save space for other items of important equipment.

Valve actuators constructed in accordance with this invention meet the above-discussed requirements.

Therefore, an object of this invention is to provide a power actuator for rotary valves in which the reciprocating motion of a fluid operated actuating piston is converted to the oscillating motion of a valve stem coupling.

Another object of this invention is to provide a power actuator of the character stated in which the piston is operably connected to the valve stem coupling through a rotor that is parallaxial with the valve stem coupling and an eccentrically located rotor pin that extends through the rotor and into the adjacent portion of the valve stem coupling.

A further object of this invention is to provide a power actuator of the character stated that is extremely compact in size for the amount of valve actuating work it is capable of performing.

A further object of this invention is to provide a power actuator of the character stated that is simple in design, rugged in construction and economical to manufacture.

With these and other objects, the nature of which will be apparent, the invention will be more fully understood by reference to the drawings, the accompanying detailed description and the appended claims.

Figure 1:
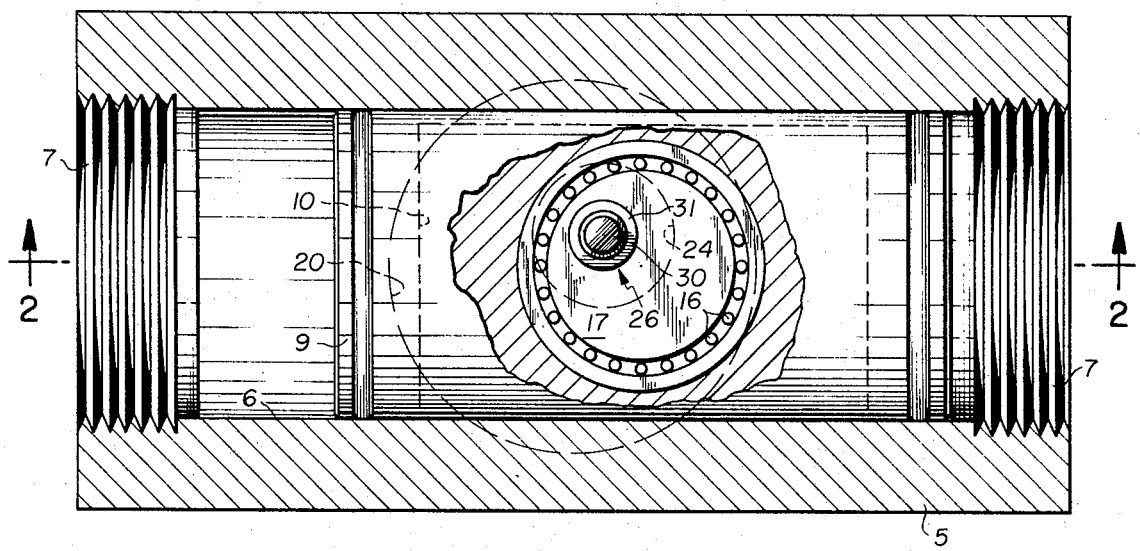
FIG. 1 is a top plan view, partly in section, of a power actuator constructed in accordance with this invention.

Referring to the drawings in detail the invention, as illustrated, is embodied in a power actuator designed for use in connection with a standard sea water valve and includes a body block 5 formed from a suitable metal and provided with a longitudinal cylindrical bore 6. The ends of the bore 6 are closed by a pair of threaded plugs or caps 7,7, each having a centrally located threaded hole 8 for connection to a source of hydraulic fluid under pressure. A piston 9, having a length somewhat shorter than the distance between the inner faces of the end caps 7, is reciprocably mounted within the bore 6.

The bottom of the piston 9 is milled or otherwise machined to define an inwardly extending relief or cavity 10 (see FIGS. 1 and 2) having a flat upper surface 11. The cavity 10 is symmetrically disposed with respect to the transverse median plane of the piston 9 and terminates somewhat short of the piston ends. A centrally located cylindrical recess 12 extends upwardly from the cavity 10 and extends into communication with a slightly smaller diameter bore 13, thus forming an abutment shoulder 14 at the juncture therebetween. A bore 15, generally corresponding to the bore 13, is formed in the top of the block 5.

The bore 12 carries a roller bearing 16 which supports a motion converting rotor 17 having a eccentrically located lower bore 18 that extends into communication with a smaller diameter upper bore 19.

The bottom of the block 5 is provided with a centrally located bore 20 that carries a roller bearing 21 which supports an oscillatable valve stem coupling 22 provided on its lower face with a splined axial recess 23 for connection with a valve stem, and provided on its upper face with an eccentrically located cylindrical recess 24 that carries a roller bearing 25 that receives the bottom of a rotor pin generally indicated 26 as will be hereinafter more fully described.

The height of the valve stem coupling 22 is such that its upper portion is positioned within the cavity 10 of the piston 9 and its top face is in juxtaposition to the flat top face 11 of the cavity 10.

The rotor pin 26 operably connects the rotor 17 with the valve stem coupling 22 and includes a bottom portion 27 that is retained within the roller bearing 25, an intermediate smaller diameter portion 28 that fits into the bore 18 of the rotor 17, an upper intermediate smaller diameter threaded portion 29 that extends above the top face of the rotor 17, and a still smaller diameter top stud portion 30 that extends upwardly through the bore 15 in the top of the block 5. A threaded sleeve 31 that is engaged over the threaded portion 29 firmly secures the rotor pin 26 to the rotor 17.

The stud portion 30 of the rotor pin 26 may be used for connection to a valve position indicator (not shown).

Before describing the operation of this power actuator, it will be assumed that it has been mechanically connected to the upstanding vertical stem of a rotary valve and that the necessary piping and control valves for high pressure fluid (on the order of 3,000 p.s.i.g.) have been connected to the end caps 8 of the block 5. It will be further assumed that the parts are in the relative positions shown in FIGS. 1 and 2 as at the start of a quarter turn (90°) valve opening step with the piston 9 at the right end limit of its reciprocation.

Now, as high-pressure fluid is admitted to the right end of the cylinder bore 6 (see FIGS. 1 and 2) the piston 9 will be urged to the left. Since the valve stem coupling 22 rotates about a fixed axis, and the axis of the rotor 17 moves along a horizontal plane as the piston 9 advances, the rotor 17, due to the interconnections between it, the rotor pin 26 and the valve stem coupling 22, is caused to rotate in a clockwise direction and in turn causes the valve stem coupling to rotate in a counterclockwise direction. The full stroke of the piston from right to left thus causes the required 90° rotation of the valve stem coupling 22 in a counterclockwise direction to either open or shut the associated valve, depending on the initial open or closed position of its plug, ball or butterfly disc.

Figure 4:
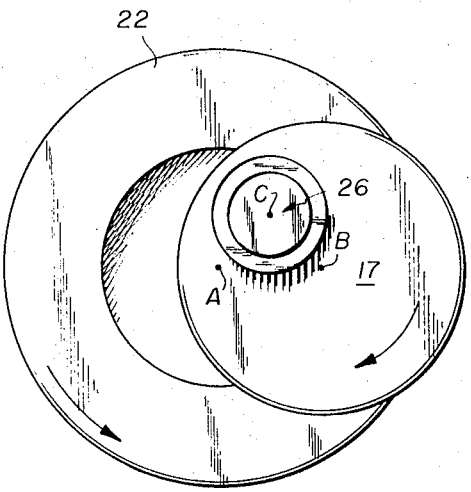
FIGS. 4—6 are diagrammatic top plan views of the relative positions of the rotor pin and valve stem coupling during one full stroke of the piston in a right to left direction as viewed in FIG. 1.
Figure 5:
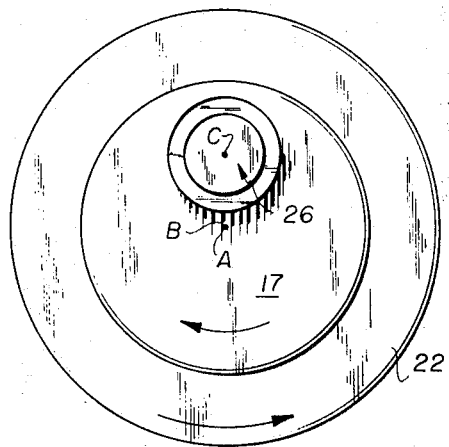
Figure 6:
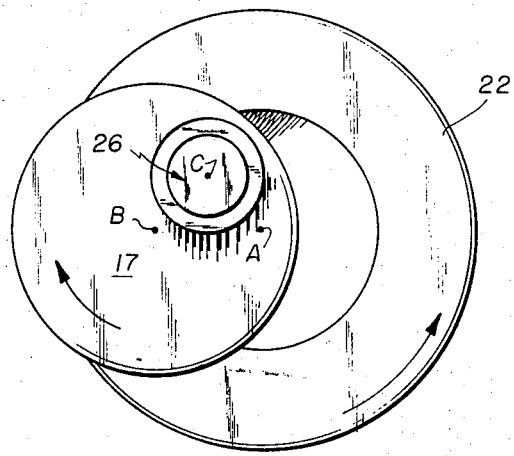

A more complete understanding of the relative motions involved may be gained from a study of FIGS. 4—6 which illustrates the relative positions of the rotor 17, the rotor pin 26 and the valve sleeve coupling 22 at the beginning, middle and end of the above-described operation. In these FIGS. the centers of the valve sleeve coupling 22 are shown in vertical alignment since it is only that element that has a fixed axis of rotation.

Figure 2:
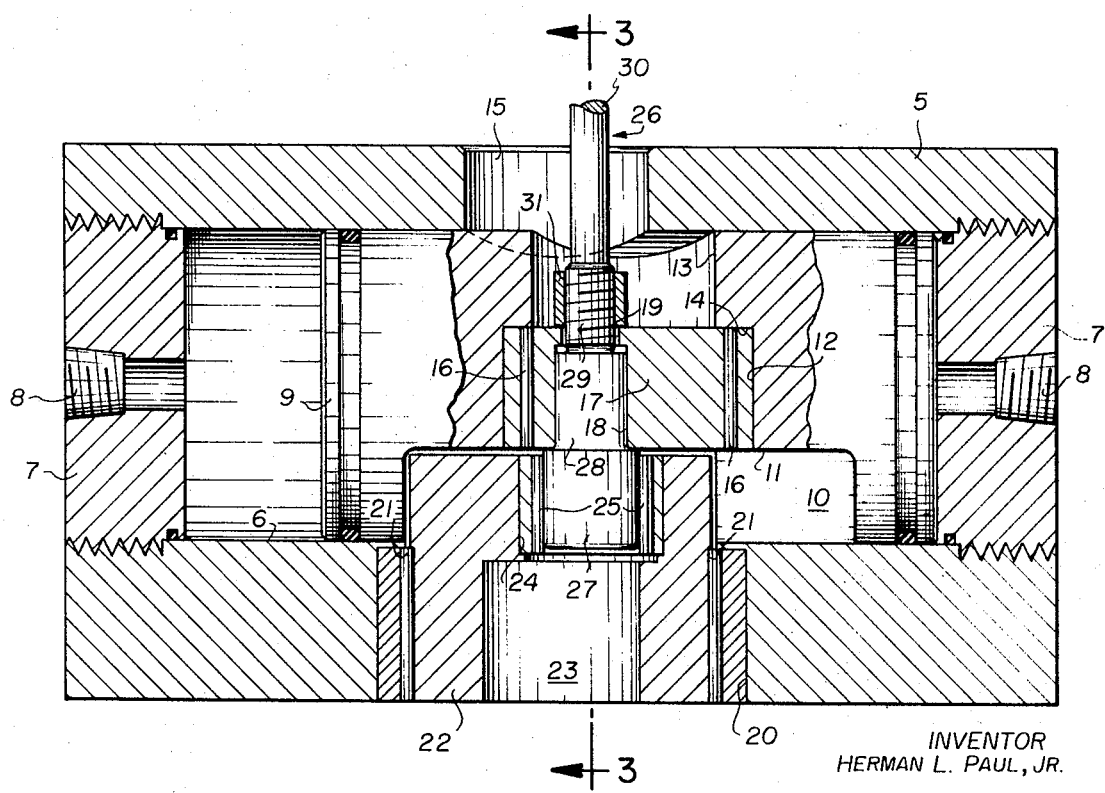
FIG. 2 is a longitudinal vertical section, partly in elevation, taken along line 2—2 of FIG. 1.
Figure 3:
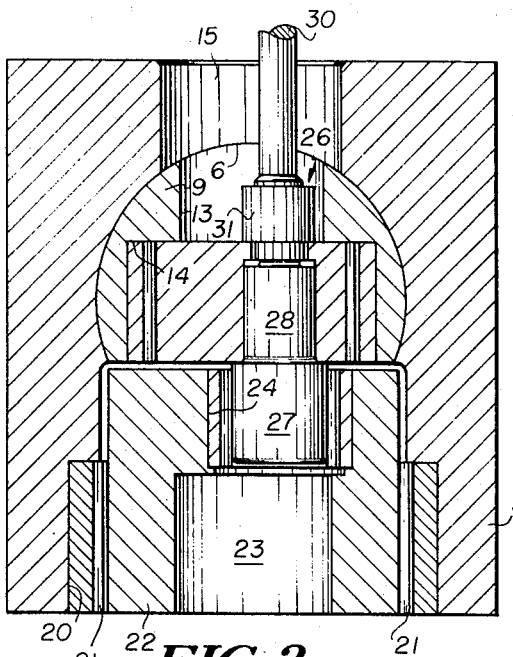
FIG. 3 is a transverse vertical section taken along line 3—3 of FIG. 2 in a plane that includes the axis of oscillation of the valve stem coupling.

FIG. 4 shows the parts in the same relative positions as in FIGS. 1 and 2 and it will be seen that the axis of rotation of the valve stem coupling 22 is at A, the axis of rotation of the rotor 17 is horizontally to the right at B and the initial axis of the rotor pin 26 is 45° to the upper right of the axis A at C.

FIG. 5 represents the relative positions of the parts at midstroke of the piston 9 from right to left, and it will be seen that the axis A has remained fixed while the axis B has moved linearly and horizontally to the left along with the movement of the piston and coincides with the axis A. This has forced the rotor 17 to rotate in a clockwise direction and caused the rotor pin 26 to move bodily through an arc of 45° in a counterclockwise direction, thus effecting a corresponding counterclockwise rotation of the valve stem coupling 22.

These same relative movements continue until the end of the stroke of the piston 9, at which time the axis A is still fixed, the axis of the rotor 17 is horizontally to the left at B, and the axis of the rotor pin 26 is 45° to the upper left of the axis A.

On the return of the piston these relative motions are reversed.

The operation of the valve actuator is relatively slow, taking upwards of 5 seconds to complete one stroke of the piston, so that there is little or no shock loading imposed on any of the parts and there is no need for any cushioning or damping devices.

Although the mechanisms of this actuator have been described as for converting rectilinear motion to oscillatory motion, it will be understood that the same mechanisms can be used in a reverse manner, if desired, in which case the valve stem coupling 22 would be the driving member to reciprocate the piston 9 to impart rectilinear motion to some device connected to the piston.

It is of course to be understood that variations in arrangements and proportions of parts may be made within the scope of the appended claims.

I claim:

1. A device for converting rectilinear motion to oscillatory motion including a body block provided with a longitudinal cylindrical bore, a piston reciprocably mounted within said bore, an oscillatable valve stem element rotatably mounted in said body block at an axis normal to that of said cylindrical bore, and means carried by said piston and operatively connected to said cylindrical element for rotating same whenever said piston is moved, said means including a rotor rotatably mounted in said piston about an axis parallel to that of said valve stem coupling, and a rotor pin connecting said rotor and said valve stem coupling and positioned eccentrically to their axes of rotation.

2. The device of claim 1 in which said valve stem coupling projects into the path of travel of said piston and into juxtaposition with said rotor, the adjacent portion of said piston being relieved to provide clearance for the projecting end of said valve stem coupling.

3. At the device of claim 2 additionally including means for reciprocating said piston.

4. A device for converting rectilinear motion to oscillatory motion including a body block provided with a longitudinal cylindrical bore, a piston reciprocably mounted within said bore, an oscillatable cylindrical element rotatably mounted in said body block at an axis normal to that of said cylindrical bore, and means carried by said piston and operatively connected to said cylindrical element for rotating same whenever said piston is moved, said means including a rotor rotatably mounted in said piston about an axis parallel to that of said oscillatable cylindrical element, and a rotor pin connecting said rotor and said oscillatable cylindrical element and positioned eccentrically to their axes of rotation.